United States Patent
Hanak et al.

(10) Patent No.: US 11,820,940 B2
(45) Date of Patent: Nov. 21, 2023

(54) ORGANIC ACID SURFACTANT BOOSTER FOR CONTAMINANT REMOVAL FROM HYDROCARBON-CONTAINING STREAM

(71) Applicant: Halliburton Energy Services, Inc., Houston, TX (US)

(72) Inventors: Vincent Andrew Hanak, Plantersville, TX (US); Chad Kiser, Santa Fe, TX (US); Richard Saulnier, Needville, TX (US); Ronald Bosch, Houston, TX (US); George Anderson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/902,133

(22) Filed: Sep. 2, 2022

(65) Prior Publication Data
US 2023/0079788 A1    Mar. 16, 2023

Related U.S. Application Data

(60) Provisional application No. 63/244,621, filed on Sep. 15, 2021.

(51) Int. Cl.
*E21B 43/34*    (2006.01)
*C09K 8/60*    (2006.01)
(Continued)

(52) U.S. Cl.
CPC ............... *C09K 8/602* (2013.01); *C09K 8/74* (2013.01); *C10G 17/02* (2013.01); *E21B 43/35* (2020.05);
(Continued)

(58) Field of Classification Search
CPC .......... C09K 8/602; C09K 8/74; E21B 43/35; E21B 43/36; E21B 43/38; C10G 17/02; C10G 2300/205; C10G 2300/4075
See application file for complete search history.

(56) References Cited

U.S. PATENT DOCUMENTS

| | | |
|---|---|---|
| 7,497,943 B2 | 3/2009 | Nguyen et al. |
| 10,947,626 B2 | 3/2021 | Pinder et al. |
| | (Continued) | |

FOREIGN PATENT DOCUMENTS

| | | |
|---|---|---|
| EP | 2038512 B1 | 10/2011 |
| WO | 2011037832 A2 | 3/2011 |
| WO | 2021/066798 A1 | 4/2021 |

OTHER PUBLICATIONS

Baker Hughes, Excalibur 7760 additive, remove metals and tramp amines during desalting, 2021.
(Continued)

*Primary Examiner* — Silvana C Runyan
(74) *Attorney, Agent, or Firm* — Thomas Rooney; C. Tumey Law Group, PLLC (57) ABSTRACT

Provided are extraction methods and systems to remove contaminants in a subterranean formation. The method of contaminant removal comprises introducing one or more organic acids and one or more organic acid surfactant boosters into a hydrocarbon-containing stream, recovering the hydrocarbon-containing stream from a subterranean formation, and separating at least a portion of the contaminants from the hydrocarbon-containing stream. The organic acids and the organic acid surfactant boosters have a synergistic effect that improves the contaminant removal efficacy of the organic acid.

18 Claims, 4 Drawing Sheets

(51) Int. Cl.
C09K 8/74 (2006.01)
C10G 17/02 (2006.01)
E21B 43/36 (2006.01)
E21B 43/38 (2006.01)

(52) U.S. Cl.
CPC .............. *E21B 43/36* (2013.01); *E21B 43/38* (2013.01); *C10G 2300/205* (2013.01); *C10G 2300/4075* (2013.01)

(56) References Cited

U.S. PATENT DOCUMENTS

| | | | |
|---|---|---|---|
| 2004/0045875 A1* | 3/2004 | Nguyen | B01D 17/047 208/251 R |
| 2005/0004239 A1* | 1/2005 | Bull | C10G 17/00 208/252 |
| 2006/0102349 A1* | 5/2006 | Brady | C09K 8/68 507/923 |
| 2008/0217012 A1* | 9/2008 | Delorey | C09K 8/703 166/244.1 |
| 2011/0146997 A1* | 6/2011 | Nguyen | C09K 8/80 166/309 |
| 2012/0187049 A1 | 7/2012 | Nguyen et al. | |
| 2020/0071265 A1* | 3/2020 | Dhawan | C07C 229/16 |
| 2020/0354839 A1* | 11/2020 | Pinder | C23F 11/143 |
| 2021/0207018 A1 | 7/2021 | Ngo et al. | |
| 2022/0041941 A1 | 2/2022 | Bosch et al. | |

OTHER PUBLICATIONS

International Search Report and Written Opinion for International Application No. PCT/US2022/042900 dated Jan. 9, 2023.
International Search Report and Written Opinion for International Application No. PCT/US2022/042898 dated Jan. 4, 2023.

* cited by examiner

ORGANIC ACID SURFACTANT BOOSTER FOR CONTAMINANT REMOVAL FROM HYDROCARBON-CONTAINING STREAM

BACKGROUND

Hydrocarbons, such as oil and gas, may be obtained from subterranean formations that may be located onshore or offshore. The development of subterranean operations and the processes involved in removing hydrocarbons from a subterranean formation typically involve different steps such as, for example, drilling a wellbore at a desired well site, treating the wellbore to optimize production of hydrocarbons, and performing the necessary steps to produce and process the hydrocarbons from the subterranean formation.

Downhole hydrocarbons and produced water systems contain impurities such as salts, solids, and metals. For instance, contaminants such as calcium naphthenate and monoethanol amine contribute to corrosion of the transportation equipment and surface process facilities. Therefore, these contaminants should be eliminated or at least greatly minimized at the wellsite before contacting surface facilities such as surface separators and oil refineries.

BRIEF DESCRIPTION OF THE DRAWINGS

These drawings illustrate certain aspects of some of the embodiments of the present disclosure and should not be used to limit or define the disclosure.

DETAILED DESCRIPTION

Disclosed herein are extraction methods and systems to remove contaminants in subterranean formation, more particularly, disclosed are synergistic additives and methods of use for metals and/or amine removal from a hydrocarbon-containing stream. Specifically, the synergistic additives include an organic acid and an organic acid surfactant booster.

A hydrocarbon-containing stream includes, for example, produced crude oil, gas, and water or brine. In one or more embodiments, the hydrocarbon-containing stream is contacted by one or more treatment fluids during a wellbore treatment operation. Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. In some embodiments, the treatment fluids may be or include a drilling fluid. In some embodiments, the well may be at a temperature greater than about 100° F. (37.8° C.). In other embodiments, the well may be at a temperature greater than about 200° F. (93.3° C.). In still other embodiments, the well may be at a temperature greater than about 250° F. (121.1° C.). In other embodiments, the well may be at a temperature greater than about 300° F. (148.9° C.). In still other embodiments, the well may be at a temperature greater than about 350° F. (176.7° C.). In other embodiments, the well may be at a temperature greater than about 400° F. (204.4° C.).

In one or more embodiments, the additives of the present disclosure may be used for contaminant control in oilfield operations. A person of skill in the art with the benefit of this disclosure will understand that the additives may be inserted into a hydrocarbon-containing stream at any suitable location. In some embodiments, the additives of the present disclosure may be pumped as a standalone treatment fluid in a subterranean wellbore. In certain embodiments, the additives of the present disclosure may be added to a treatment fluid prior to the treatment fluid being introduced into the wellbore. In other embodiments, the additives of the present disclosure may be added to the treatment fluid after the treatment fluid has been introduced into the wellbore. For instance, the synergistic additives may be added to another treatment fluid such as drilling fluids, stimulation fluids (matrix acidizing, fracturing fluid), scale dissolution and removal fluids, completion fluids, gravel packing fluids and the like. In still other embodiments, the additives of the present disclosure may be added to the treatment fluid along with one or more other salt control additives. In some embodiments, the additives of the present disclosure may be pumped directly downhole through a coil tubing or a similar umbilical cord. In some embodiments, the additives of the present disclosure may be transported downhole in a sampling bottle in a downhole fluid sampling and analysis tool or the like to remove contaminants from the downhole samples. In some embodiments, the additives of the present disclosure may be used to remove contaminant of the vessel used for downhole fluid analysis in the downhole fluid sampling and analysis tool. In other embodiments, the additives of the present disclosure may be added to the recovered hydrocarbon-containing stream at the surface before or after the primary separation but before the secondary separation. In some offshore embodiments, the additives of the present disclosure may be injected before the floating production storage and offloading unit or inside the floating production storage and offloading unit. In some embodiments, the additives of the present disclosure may be injected at the surface but before transportation of the hydrocarbon-containing stream subsea. The introduction of the additives of the present disclosure to subsea or surface separation of water and oil units will partition the organic contaminants such as naphthenic acids and other water solubilized organics to the oil phase, and the amine and inorganic contaminants in the oil to the water phase.

In certain embodiments, the additives of the present disclosure may be used for water soluble organics control in offshore applications. In some embodiments, the additives of the present disclosure may be used for contaminant control in calcium naphthenate control in production wells. In some embodiments, the compositions and methods of the present disclosure may be used to treat a hydrocarbon-containing stream involved in one or more subterranean treatment operations. For example, in certain embodiments, the compositions and methods of the present disclosure may be used to treat at least a portion of a hydrocarbon-containing streams within a well penetrating at least a portion of a subterranean formation. In certain embodiments, the compositions of the present disclosure may be injected alone into the subterranean formation as a single treatment fluid. In one or more embodiments, the compositions of the present disclosure may be combined with another treatment fluid that is pumped into the subterranean formation. In certain embodiments, the compositions and methods of the present disclosure may be used to treat the recovered hydrocarbon-containing stream of the subterranean formation. In one or more embodiments, the composition of the present disclosure is pumped through an injector well.

Disclosed herein are synergistic additives and methods of use for metals and/or amine removal from hydrocarbon liquids and produced water. Specifically, the synergistic additives include an organic acid and an organic acid surfactant booster. The organic acid introduced into the hydrocarbon liquid may be any of a variety of suitable organic acids. Examples of suitable organic acids include acetic acid, citric acid, formic acid, maleic acid, glycolic acid, oxalic acid, lactic acid, uric acid, malic acid, and tartaric acid, and any combination thereof. The organic acid may be included in the hydrocarbon liquid and/or treatment fluid in any suitable amount for contaminant removal, including an amount of about 0.001% to about 2% by weight of the hydrocarbon liquid. In some embodiments, the organic acid may be included in the hydrocarbon liquid and/or treatment fluid in an amount of about 0.01% to about 0.5% by weight of the hydrocarbon liquid.

The organic acid surfactant booster may generally include surfactants that improve the contaminant removal efficacy of the organic acid. Examples of suitable organic acid surfactant boosters include betaine, phosphate esters, quaternary amines, polyols, complex polyols esters, sulfonates, sulfosuccinates, thiophosphate esters, alcohol alkoxylates and sorbitan monooleates. The selection of the particular organic acid surfactant booster depends on a number of factors, including molecular weight, conformation of the surfactant booster as it relates to the molecular weight of the organic acid, the type of contaminant in the hydrocarbon-containing stream, and the physics of the mixing regime in the tubing. The organic acid surfactant booster can be included in the hydrocarbon-containing stream and/or treatment fluid in any suitable amount for contaminant removal, including an amount of about 0.001% to about 2% by weight of the hydrocarbon-containing stream. In some embodiments, the organic acid booster may be included in the hydrocarbon-containing stream and/or treatment fluid in an amount of about 0.01% to about 0.5% by weight.

In certain embodiments, the organic acid surfactant booster may include a betaine. Examples of suitable betaines include cocamidopropyl betaines or ([3-(dodecanoylamino) propyl] (dimethyl)ammonio) acetate and similar common surfactants such as alkyl betaines, alkyl amidopropyl betaines, alkylamidobetaine, oleoamidopropyl betaines, and any derivative and combination thereof. In some embodiments, the betaine is present in an amount of about 0.01% to about 0.1% by weight of the hydrocarbon liquid and/or treatment fluid. It should be understood that the synergy is best at lower betaine concentrations with the synergistic effect first being diluted by the replacement of the acid as the concentration increases, and then the betaine becoming antagonistic as the betaine approaches concentration sufficient to cause emulsification.

In certain embodiments, the organic acid surfactant booster may include thiophosphate esters such as poly(oxy-1,2-ethanediyl), α-(nonylphenyl)-Ω-hydroxy-phosphate and 2-ethylhexan-1-ol, phosphoric acid and similar surfactants. In some embodiments, the thiophosphate ester is present in an amount of about 0.03% to about 0.3% by weight of the hydrocarbon liquid. It should be understood that the synergy is best at lower thiophosphate ester concentrations with the synergistic effect first being diluted by the replacement of the acid as the concentration increases, and then the thiophosphate ester becoming antagonistic as the thiophosphate ester approaches concentration sufficient to cause emulsification.

In certain embodiments, the organic acid surfactant booster may include quaternary amines such as N-alkyl-N-benzyl-N,N-dimethyl ammonium chloride and benzyl dodecyl dimethyl ammonium bromide, ethylene bis (hexadecyl trimethyl ammonium chloride) and similar surfactants. In some embodiments, the quaternary amine is present in an amount of about 0.01% to about 0.1% by weight of the hydrocarbon liquid. It should be understood that the synergy is best at lower quaternary amine concentrations with the synergistic effect first being diluted by the replacement of the acid as the concentration increases, and then the quaternary amine becoming antagonistic as the quaternary amine approaches concentration sufficient to cause emulsification.

In certain embodiments, the organic acid surfactant booster may include polyols such as the polyols resulting from reactions with molecules having two or more chains, each of which has an end hydroxyl group and consists of units of propylene or ethylene linked together by ether. Such products are polypropylene glycol, polyethylene glycol, adducts of glycerol and other polyhydric alcohols with propylene oxide or ethylene oxide, adducts of carbohydrate or amines with such oxides and the like having molecular weights between 300 and 3000 Daltons. Many of these are antagonistic to contaminant removal, and caused immediate emulsions, but some are moderately effective at increasing the removal percentages. In some embodiments, the polyol is present in an amount of about 0.01% to about 1% by weight of the hydrocarbon liquid.

In certain embodiments, the organic acid surfactant booster may include complex polyol esters containing the above polyols esterified with maleic anhydride, fumaric acid, and/or acrylic acid.

In certain embodiments, the organic acid surfactant booster may include sulfonates such as linear and branched dodecyl benzene sulfonic acids and alkyl naphthalene sulfonic acids and their amine and mineral salts. In some embodiments, the sulfonates are present in an amount of about 0.02% and to about 2% by weight of the hydrocarbon liquid. At low concentrations, the sulfonates are synergistic with the organic acid, but have exceptionally narrow ratios before becoming antagonistic.

In certain embodiments, the organic acid surfactant booster may include sulfosuccinates such as dioctyl sulfosuccinate and disodium 4-(oleamido mipa)-sulfosuccinate and similar surfactants. In some embodiments, the sulfosuccinates are present in an amount of about 0.02% to about 2% by weight of the hydrocarbon liquid. At low concentrations, the sulfosuccinates are synergistic with the organic acid, but have exceptionally narrow ratios before becoming antagonistic.

In certain embodiments, the organic acid surfactant booster may include thiophosphate esters and thiophosphates such as di-butyl thiophosphate ester, butyl thiophosphate ester, 2-ethyl hexane thiophosphate and tributyl thiophosphate. In some embodiments, the thiophosphate esters and/or thiophosphates are present in an amount of about 0.001% to about 0.5% by weight of the hydrocarbon liquid.

In certain embodiments, the organic acid surfactant boosters may include alcohol alkoxylates such as alcohols, $C_{13\text{-}15}$-branched and linear alcohol, butoxylated alcohol, propoxylated alcohol and/or ethoxylated alcohol and sorbitan monooleate.

The organic acid and organic acid surfactant booster may be used at any suitable weight ratio. The organic acid surfactant booster should be included in an amount sufficient for partitioning contaminants from the oil phase to the water phase. By way of example, suitable ratios include an organic acid surfactant booster to organic acid mole ratio of about 0.01 to 1, about 0.1 to 1, or about 0.5 to 1. In some embodiments, the organic acid surfactant booster and organic acid are provided in an additive that is added to a hydrocarbon liquid and/or a water feed. In other embodiments, the organic acid booster and organic acid are separately introduced into the hydrocarbon liquid and/or a water feed.

Among the many potential advantages to the methods and compositions of the present disclosure, only some of which are alluded to herein, the methods and compositions of the present disclosure may provide improved performance in the removal of unwanted contaminants in the hydrocarbon liquid. For example, in certain embodiments, the organic acid surfactant booster may have a synergistic effect with the organic acid, such that less organic acid is necessary to achieve the same level of contaminants removal in the hydrocarbon-containing stream than the amount of organic acid that would be necessary without the betaine. This may reduce the potential issues that can be caused by organic acid injection and may reduce costs typically associated with those issues. In certain embodiments, no deleterious effects can be found from this additive in either the refinery product or the downstream water treatment. Without intending to be limited to any particular theory or mechanism, it is believed that in some embodiments the synergy of the organic acid surfactant booster with the organic acids may be more effective at removing contaminants from hydrocarbon-containing stream than either the betaine or organic acid alone.

In certain embodiments, the contaminants in the hydrocarbon-containing stream may include, but are not limited to calcium and calcium salts, calcium naphthenates, primary amines, secondary amines, and the like, and any combination thereof. In certain embodiments, the additive of the present disclosure may reduce the total amount of the additive necessary to achieve a suitable reduction of both calcium naphthenate and monoethanol amine in the hydrocarbon-containing stream.

As discussed above, the synergistic additive of the organic acid and organic acid surfactant booster may facilitate partitioning at least a portion of the contaminant from an oil phase to a water phase. For example, from 10 ppm to 4% by weight calcium naphthenate and from 100 ppm to 2% by weight of amines are contained in either the oil, the water, the solids, or the emulsion formed in an oil well as part of the production. The synergistic additive of the organic acid and organic acid surfactant booster partition calcium naphthenate and the amines to either the oil, the water, or the interface during primary separation. The products are added to direct that partitioning to either the water or the oil based on the native primary solubility. This allows them to be managed in separated streams more effectively. The synergistic additive of the organic acid and organic acid surfactant booster manage the solubility of the contaminants. In some embodiments, all cationic contaminants (amines and metals) are promoted to greater solubility in water, while all anionic contaminants (naphthenic acids, sulfur containing species, etc) are promoted preferentially to the oil phase. For instance, mineral anions have a much lower solubility in oil than organic anions. In one or more embodiments, the method may further comprise separating the hydrocarbon-containing stream into a water portion and a hydrocarbon portion. The separating may occur at the surface or downhole as desired for a particular application. Any suitable technique for oil-water separation may be used in accordance with present embodiments, including free water knock outs, electrostatic coalescers, heater treaters, desalters, flotation units, corrugate plate interceptors, hydrocyclones, and centrifuges.

In some embodiments, the synergistic additive of the organic acid and organic acid surfactant booster is included in a treatment fluid. The additive may be included in the treatment fluid at any suitable time for contaminant treatment, including at the surface before introduction into the wellbore or after recovery from the wellbore. In other embodiments, the additive may be added to the treatment fluid after the treatment fluid has been introduced into the wellbore. In some embodiments, the organic acid and organic acid surfactant booster may be separately added to the treatment fluid. In other embodiments, the organic acid and organic acid surfactant booster may be mixed prior to their addition to the treatment fluid The treatment fluids used with the compositions and methods of the present disclosure may include any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluids such as its mass, amount, pH, etc. Aqueous fluids that may be suitable for use in the methods and compositions of the present disclosure may include water from any source. Such aqueous fluids may include fresh water, salt water (e.g., water containing one or more salts dissolved therein), brine (e.g., saturated salt water), seawater, or any combination thereof. In many embodiments of the present disclosure, the aqueous fluids may include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and compositions of the present disclosure include, but are not limited to, oils, hydrocarbons, organic liquids, and the like. In certain embodiments, the fracturing fluids may include a mixture of one or more fluids and/or gases, including but not limited to emulsions, foams, and the like.

In certain embodiments, the treatment fluids used with the compositions and methods of the present disclosure optionally may include any number of additional additives. Examples of such additional additives include, but are not limited to, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids of the present disclosure for a particular application.

The treatment fluids used with the compositions and methods of the present disclosure may be prepared using any suitable method and/or equipment (e.g., blenders, mixers, stirrers, etc.) known in the art at any time prior to their use. The treatment fluids may be prepared at least in part at a well site or at an offsite location. In certain embodiments, the additives, and/or other components of the treatment fluid may be metered directly into a base treatment fluid to form a treatment fluid. In certain embodiments, the base fluid may be mixed with the additives, and/or other components of the treatment fluid at a well site where the operation or treatment is conducted, either by batch mixing or continuous ("on-the-fly") mixing. The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. In other embodiments, the treatment fluids of the present disclosure may be prepared, either in whole or in part, at an offsite location and transported to the site where the treatment or operation is conducted. In introducing a treatment fluid of the present disclosure into a portion of a subterranean formation, the components of the treatment fluid may be mixed together at the surface and introduced into the formation together, or one or more components may be introduced into the formation at the surface separately from other components such that the components mix or intermingle in a portion of the formation to form a treatment fluid. In either such case, the treatment fluid is deemed to be introduced into at least a portion of the subterranean formation for purposes of the present disclosure.

The treatment fluid containing the organic acid and organic acid surfactant booster of the present disclosure may be used for removal of calcium and calcium salts, calcium naphthenates, primary amines, secondary amines, and the like, and any combination thereof in any suitable operation at any suitable stage of the wellbore's life, which include, but is not limited to well drilling and production. The treatment fluid may be introduced into the wellbore and may remove any form of calcium salts and amines from any surface along the wellbore and associated processing equipment by making fluidic contact with the organic acid and organic acid surfactant booster. Example methods of using the treatment fluid containing the organic acid and organic acid surfactant booster may be described in more detail with reference to FIG. 1 and FIG. 2.

Figure 1:
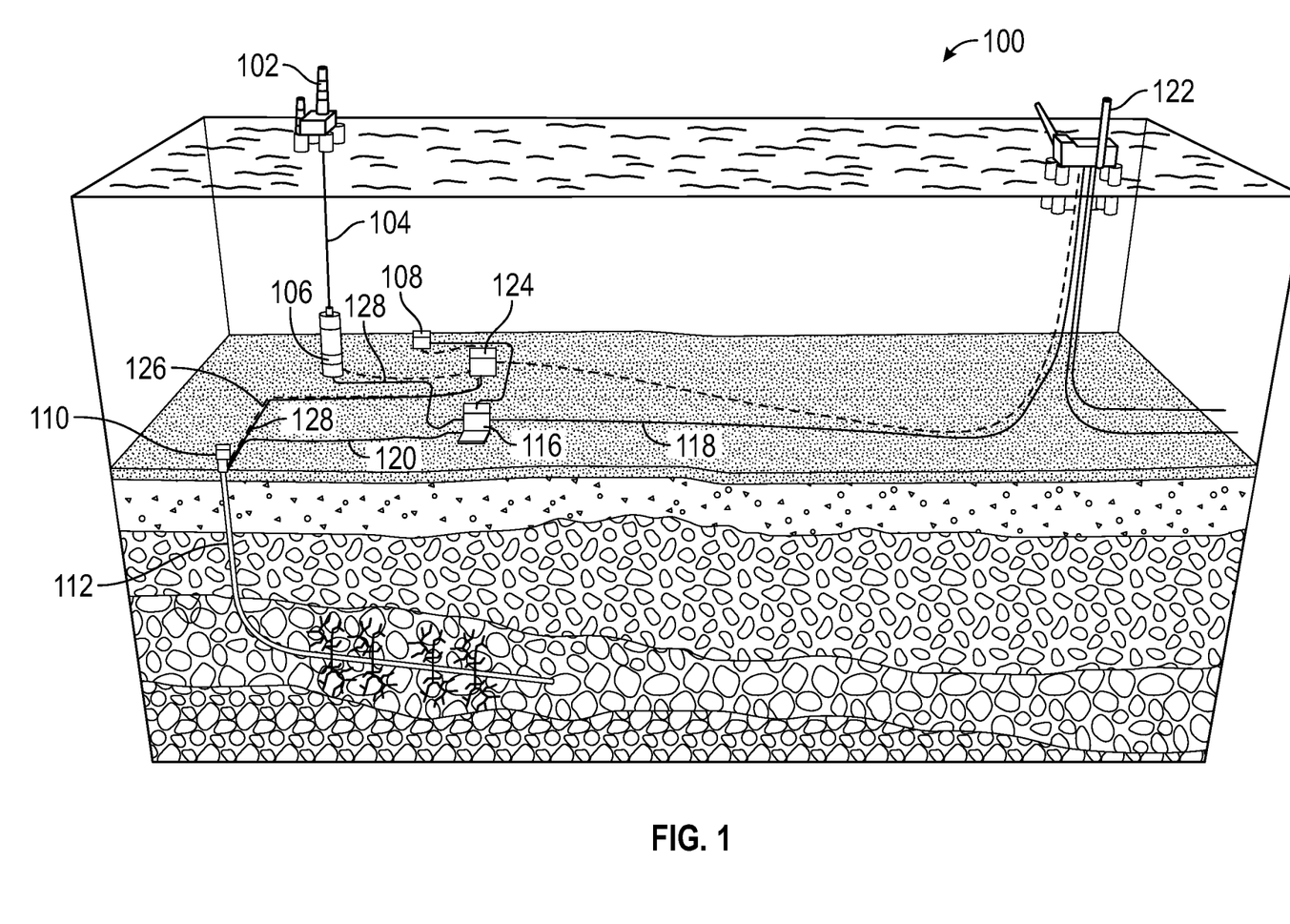
FIG. 1 is a flow diagram illustrating contaminant removal in downhole operations in accordance with some embodiments of the present disclosure.

FIG. 1 illustrates an example of a well system 100 to remove contaminants in hydrocarbon liquids and, more particularly, a well system 100 to introduce the synergistic additives of the present disclosure for metals and/or amine removal from hydrocarbon liquids. FIG. 1 illustrates a schematic subsea system into which the organic acid and organic acid surfactant booster of the present disclosure can be introduced for metals and/or amine removal from hydrocarbon liquids, according to one or more embodiments of the present disclosure. The subsea system 100 may have components, as described below, located in more than 500 to 3,500 meters of seawater, where the temperature can be less than or equal to about 5° C. As shown, the subsea system 100 includes a drilling rig 102. The drilling rig 102 is illustrated as a floating platform, but it is to be appreciated that the drilling rig may be any type of bottom supported platform or floating platform, without departing from the scope of the present disclosure. Accordingly, without limitation, the drilling rig may be a stationary rig, a jack-up rig, a semi-submersible rig, a drill ship, a tension leg platform rig, a guyed rig, an articulated column rig, and the like. Many other configurations are possible and have been developed over the years. A drilling riser 104 is shown extending from the drilling rig 102 below the sea surface, where the drilling riser 104 is in fluid communication with the drilling rig 102 via a top riser stress joint. The drilling riser 104 is equipped with a subsea blowout preventer (BOP) stack 106, which operates to seal, control, and monitor pressure and uncontrolled flow emanating from a well reservoir. The BOP 106 may be installed at any location below the drilling rig, included on the sea floor, as shown. The drilling riser 104 (and BOP 106) is installed at the seafloor to a subsea wellhead 108, and fluidly coupled thereto via a bottom riser stress joint. It is to be appreciated that the top and bottom riser stress joints may be located at any length along drilling riser 104 between the riser 104 and the drilling rig 102 and the subsea wellhead 108 depending on the design of the particular subsea system, without departing from the scope of the present disclosure.

The subsea wellhead 108 provides the suspension point and pressure seals for casing string that run from the bottom of the hole sections to the surface pressure control equipment. Additional components of the system 100 include a subsea tree 110 that defines the top of wellbore 112, which provides a control to the flow of in and out of the wellbore 112. The wellbore 112 may be cased, uncased, or partially cased, without departing from the scope of the present disclosure. A subsea header (s) 116, flowline (s) 118, and flowline jumper (s) 120 are shown for distributing fluids to and from the surface, wellbore, or production platform 122. An umbilical system provides communication between subsea controls and topside controls for all equipment. As shown, the umbilical system includes a subsea umbilical termination assembly (SUTA) 124, flying lead (s) 126, and umbilical line (s) 128. As used herein, the term "umbilical" or "umbilical line," and grammatical variants thereof, refers to any one or more conduits capable of introducing at least chemical substances and fluids, including the organic acid and organic acid surfactant booster of the present disclosure, into a subsea system. The umbilical system can transmit fluid (e.g., as a chemical injection) and/or electrical current necessary to control the functions of the subsea components of the system 100. Accordingly, the umbilical system allows fluid flow through the drilling riser 104 and throughout the subsea components of the system 100 and to the production platform 122. Additional conduits can be in operation in a subsea installation such as capillary string injection lines.

The configuration illustrated in FIG. 1 permits the flow of the synergistic additives of the present disclosure alone or added to another treatment fluid such as matrix acidizing, scale dissolution and removal fluids, completion fluids and the like, through the drilling riser 104 from the drilling rig 102 at the surface of the sea, through the BOP 106, and to the wellhead 108, where the treatment fluid can then be circulated in the wellbore and throughout the remainder of the system 100. The system 100 additionally provides a conduit for circulated treatment fluids to be returned from the wellbore to the surface. In some embodiments, the organic acid and organic acid surfactant booster of the present disclosure can be introduced through the umbilical line (s) 128 to remove contaminants, such as metals and/or amine and the like, from hydrocarbon liquids within the system 100, such as at or after the subsea wellhead, which can be then distributed in a one-way direction. Any other means of introducing the organic acid and organic acid surfactant booster of the present disclosure alone or added to other treatment fluids described herein into a subsea (or land-based system) may be suitable, without departing from the scope of the present disclosure including, but not limited to, tubing string (e.g., casing), coiled tubing, one or more flowline (s) 118, and the like, and any combination thereof.

It is to be recognized that system 100 is merely exemplary in nature and various additional components may be present that have not necessarily been depicted in FIG. 1 in the interest of clarity. Non-limiting additional components that may be present include, but are not limited to, any components used as part of a subsea drilling and production system, such as subsea drilling systems, subsea Christmas trees and wellhead systems, umbilical and riser systems, subsea manifolds and jumper systems, tie-in and flowline systems, control systems, subsea installation, and any combination thereof. Such non-limiting components may include, but are not limited to, supply hoppers, valves, fasteners, condensers, adapters, joints, gauges, sensors, compressors, pressure controllers, pressure sensors, flow rate controllers, flow rate sensors, temperature sensors, transmitters, hydraulic distribution manifolds and modules, logic caps, couplers (e.g., hydraulic, electrical, and the like), spools, seals, hangers, bushings, and the like.

Figure 2:
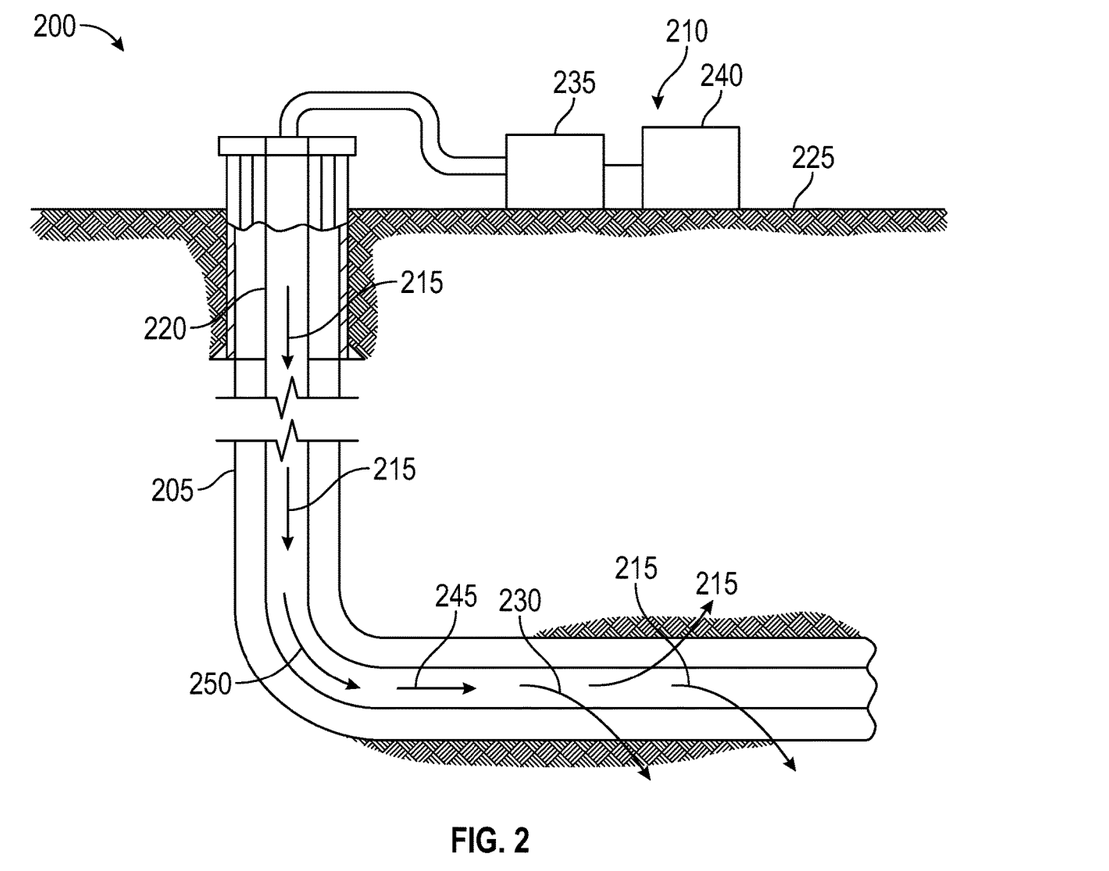
FIG. 2 is another flow diagram illustrating contaminant removal in downhole operations in accordance with some embodiments of the present disclosure.

FIG. 2 illustrates an example of a land-based system 200 for introduction of the treatment fluids described herein into a wellbore 205. As depicted in FIG. 2, system 200 may include a fluid handling system 210 for introducing a treatment fluid 215 into the wellbore by way of tubular 220. A treatment fluid 215 may include at least an organic acid and organic acid surfactant booster disclosed herein in any desirable volume and concentration. In the illustrated embodiment, the fluid handling system 210 is above the surface 225 while wellbore 205 and tubular 220 are below the surface 225. The fluid handling system 210 can be configured in any suitable manner to the operation and may include additional or different features as appropriate.

Referring to FIG. 2, wellbore 205 may include vertical and horizontal sections. Generally, a wellbore 205 may include horizontal, vertical, slant, curved, and other types of wellbore geometries and orientations. Wellbore 205 may include a casing that is cemented or otherwise secured to the wellbore wall. Wellbore 205 can be uncased or include uncased sections. Fluid handling system 210 may include mobile vehicles, immobile installations, skids, hoses, tubes, fluid tanks or reservoirs, pumps, valves, and/or other suitable structures and equipment. For example, the fluid handling system 210 may include pumping equipment 235 and a fluid supply 240, which both may be in fluid communication with the tubular 220. The fluid supply 240 may contain the treatment fluid 215 including the organic acid and organic acid surfactant booster. The pumping equipment 235 may be used to supply the treatment fluid 215 from the fluid supply 240, which may include tank, reservoir, connections to external fluid supplies, and/or other suitable structures and equipment. Pumping equipment 235 may be coupled to tubular 220 to communicate the treatment fluid 215 into wellbore 205. Fluid handling system 210 may also include surface and down-hole sensors (not shown) to measure pressure, rate, temperature and/or other parameters of treatment. Fluid handling system 210 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment.

In the example illustrated in FIG. 2, a multi-step treatment is performed. First, a matrix acidizing fluid 230 is pumped into the wellbore 205 into the subterranean formation. Then, a scale dissolution and removal fluid 245 is pumped into the wellbore 205. In the third stage, a treatment fluid 250, including the organic acid and organic acid surfactant booster disclosed herein combined with the scale dissolution and removal fluid, is pumped into the wellbore 205. Finally, the treatment fluid including the organic acid and organic acid surfactant booster of the present disclosure is pumped alone into the wellbore 205. It is to be recognized that system 200 is merely exemplary in nature and various alternative method steps or combination of steps may be present that have not necessarily been depicted in FIG. 2 in the interest of clarity.

The present disclosure provides extraction methods and systems to remove contaminants in hydrocarbon liquids and, more particularly, disclosed are synergistic additives and methods of use for metals and/or amine removal from hydrocarbon liquids. Specifically, the synergistic additives include an organic acid and an organic acid surfactant booster. The methods and systems may include any of the various features disclosed herein, including one or more of the following statements.

Statement 1. A method of contaminant removal comprising: introducing one or more organic acids and one or more organic acid surfactant boosters into a hydrocarbon-containing stream; recovering the hydrocarbon-containing stream from a subterranean formation; and separating at least a portion of contaminants from the hydrocarbon-containing stream, wherein at least the one or more organic acids and/or the one or more organic acid surfactant boosters interact with the contaminants in the hydrocarbon-containing stream.

Statement 2. The method of embodiment 1, wherein the one or more organic acids comprises at least one organic acid selected from the group consisting of acetic acid, citric acid, formic acid, maleic acid, glycolic acid, oxalic acid, lactic acid, uric acid, malic acid, and tartaric acid, and any combination thereof.

Statement 3. The method of embodiment 1 or embodiment 2, wherein the one or more organic acid surfactant boosters comprise at least one surfactant selected from the group consisting of a betaine, phosphate ester, a quaternary amine, a polyol, a complex polyol ester, a sulfonate, a sulfosuccinate, a thiophosphate ester, an alcohol alkoxylate, a sorbitan monooleate, and any combination thereof.

Statement 4. The method of any of embodiments 1-3, wherein the one or more organic acid surfactant boosters comprise a cocamidopropyl betaine.

Statement 5. The method of any of embodiments 1-4, wherein the one or more organic acid surfactant boosters comprise a thiophosphate ester.

Statement 6. The method of any of embodiments 1-5, wherein the one or more organic acids and one or more organic acid surfactant boosters are injected in an injector well.

Statement 7. The method of any of embodiments 1-6, wherein the one or more organic acids and the one or more organic acids surfactant boosters are introduced into the hydrocarbon-containing stream at about a 0.01 to about 5% mol ratio surfactant to organic acid.

Statement 8. The method of any of embodiments 1-7, wherein the one or more organic acids and the one or more organic acids surfactant boosters are separately added to the hydrocarbon-containing stream.

Statement 9. The method of any of embodiments 1-8, wherein the introducing the one or more organic acids and one or more organic acid surfactant boosters into the hydrocarbon-containing stream comprises introducing the one or more organic acids and the one or more organic acid surfactant boosters into a wellbore to contact the hydrocarbon-containing stream in the wellbore.

Statement 10. The method of any of embodiments 1-9, wherein the separating is performed in the wellbore.

Statement 11. The method of any of embodiments 1-10, wherein the separating is performed subsea.

Statement 12. The method of any of embodiments 1-11, wherein the introducing one or more organic acids and one or more organic acid surfactant boosters into the hydrocarbon-containing stream comprises flowing the one or more organic acids and one or more organic acid surfactant boosters through an umbilical to a subsea wellhead.

Statement 13. The method of any of embodiments 1-12, wherein one or more organic acids and one or more organic acid surfactant boosters are added to a treatment fluid that is pumped into a well bore.

Statement 14. The method of any of embodiments 1-13, wherein the separating further comprises removing salt from the hydrocarbon-containing stream.

Statement 15. The method of any of embodiments 1-14, wherein the separating removes amines from the hydrocarbon-containing stream in an amount of about 50% or more by weight of the hydrocarbon-containing stream and further removes calcium from the hydrocarbon-containing stream in an amount of about 30% or more by weight of the hydrocarbon-containing stream.

Statement 16. The method of any of embodiments 1-15, wherein the separating removes the amines from the hydrocarbon-containing stream in an amount of about 80% or more by weight of the hydrocarbon-containing stream and further calcium from the hydrocarbon-containing stream in an amount of about 70% or more by weight of the hydrocarbon liquid.

Statement 17. A method of contaminant removal comprising: introducing one or more organic acids and one or more betaines into a wellbore to contact a hydrocarbon-containing stream; and separating salt from the hydrocarbon-containing stream, wherein the separating salt further removes at least amines and calcium from the hydrocarbon-containing stream.

Statement 18. The method of embodiment 17, wherein the one or more organic acids and one or more betaines are introduced into the wellbore through coiled tubing.

Statement 19. The method of embodiment 17 or embodiment 18, wherein the one or more betaines comprise a cocamidopropyl betaine.

Statement 20. The method of any of embodiments 17-19, wherein the one or more organic acids and the one or more betaines are introduced into the treatment fluid at an organic acid to organic acid surfactant booster mole ratio of about 0.01:0.5.

EXAMPLES

To facilitate a better understanding of the present invention, the following examples of certain aspects of some embodiments are given. In no way should the following examples be read to limit, or define, the entire scope of the disclosure.

Example 1

Figure 3:
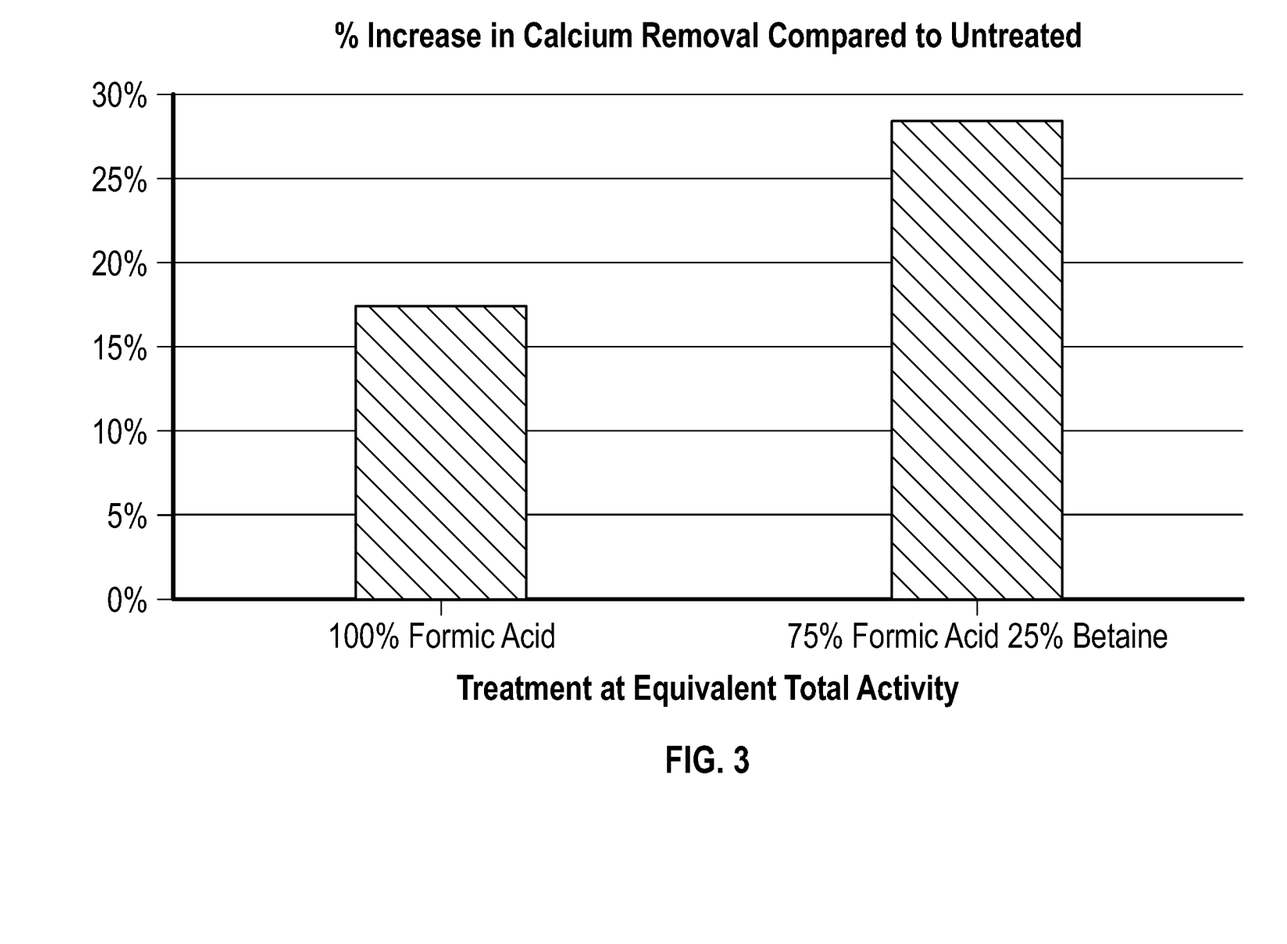
FIG. 3 is a graph illustrating the contaminant removal effectiveness of an additive in accordance with some embodiments of the present disclosure.

In this example, the contaminant removal efficacy of an organic acid (formic acid) was tested against an additive of the present disclosure, which included formic acid and a betaine. The formic acid and the betaine were included in a formic-acid-to-betaine weight ratio of 3:1. For the tests, synthetic oil were used for the initial tests in the development phase and then crude oil in confirmation testing. Crude oil or synthetic oil was poured into a bottle. Then, a blend of 500 ppm of naphthenic acid with calcium hydroxide with or without a blend of 200 ppm monoethanol amine triazine was added to the bottle and shaken. The mixture was then heated to the inlet temperature of the desalter. An aliquot of wash water with the organic acid alone or combined with about 10 ppm to about 1000 ppm of the organic acid surfactant booster with the specified weight ratio is prepared and heated to the inlet temperature of the desalter. Then, the heated aliquot is injected into the heated bottle containing the oil and the blend of naphthenic acid with calcium hydroxide. The bottle is shaken for one minute at high shear. Then, the water is allowed to separate, and samples of the water are analyzed by Ion Chromatography and Inductively Coupled Plasma Spectroscopy to determine the concentrations of amine and calcium ions. 1 mL of 37% hydrochloric acid is then added to the bottle containing the oil sample and the mixture is shaken 20 times. The distilled water is separated, and the concentrations of amine and calcium ions measured by Ion Chromatography and Inductively Coupled Plasma Spectroscopy as well. The removal efficiency is calculated as a function of mass balance of the calcium ions and monoethanol amine partitioned to the water by the organic acid alone or in combination with the organic acid surfactant booster as compared to the calcium ions and monoethanol amine partitioned to the water by an untreated sample. This test was repeated with the 3:1 mixture of formic acid and betaine. As shown in FIG. 3, the betaine and organic acid additive of the present disclosure outperformed the pure organic acid sample significantly despite treatment at equivalent total activities. The pure formic acid increases the calcium removal by 17.5% while the 75% formic acid and 25% betaine mixture increases the calcium removal by 28%.

Example 2

This example was performed to illustrate the contaminant removal efficacy of various organic acid surfactant boosters. The organic acid surfactant boosters tested were betaine, phosphate ester, quaternary amine, polyol, complex polyol ester, alcohol alkoxylate, and thiophosphate ester as shown in Column A of Table 1 below. Each organic acid surfactant booster was tested with citric acid, glycolic acid, acetic acid, and formic acid. The organic acid and organic acid surfactant booster were included in a formic-acid-to-betaine mole ratio of 19:1.

The same procedure described in Example 1 was repeated for each combination of organic acid and organic acid surfactant booster. A control sample was also tested that included pure organic acid. The additional surfactants were tested but emulsified in the organic acids so they were not effective. These additional surfactants were sulfonate, sulfosuccinate, and sorbitan monooleate.

Figure 4:
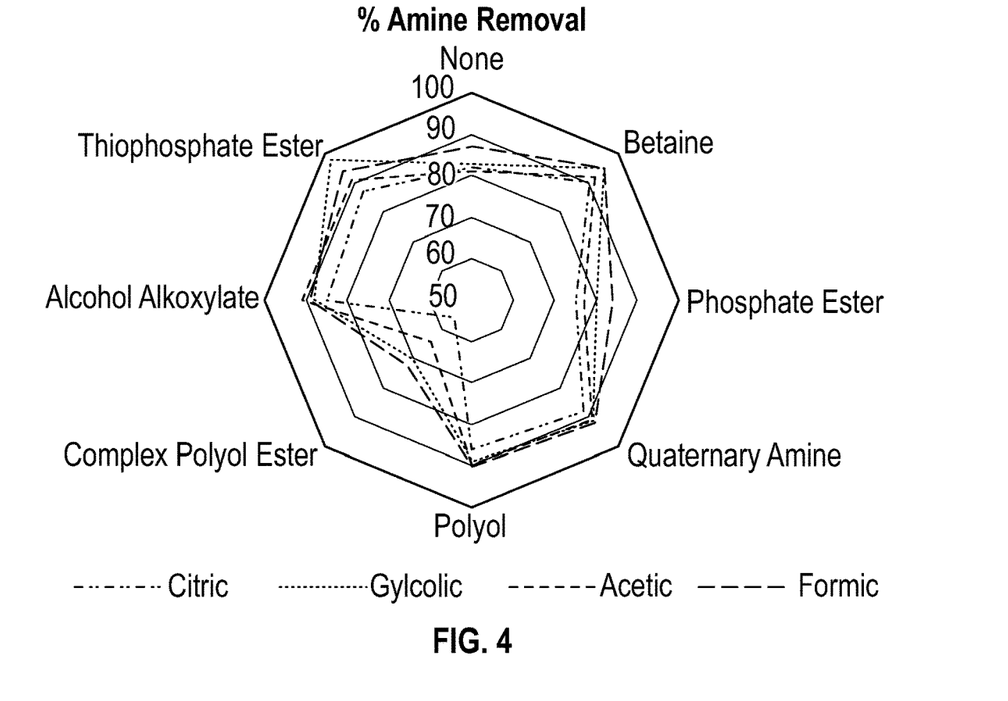
FIG. 4 is a graph illustrating the contaminant removal effectiveness for various additives in accordance with some embodiments of the present disclosure.

The percentage of amine removed from the solution was recorded as a function betaine, phosphate ester, quaternary amine, polyol, complex polyol ester, alcohol alkoxylate, and thiophosphate ester in combination with citric acid, glycolic acid, acetic acid, and formic acid, respectively. The results are provided on FIG. 4 and summarized in Table 1 below:

TABLE 1

| Column A | B Citric | C Glycolic | D Acetic | E Formic |
|---|---|---|---|---|
| None | 82% | 84% | 81% | 87% |
| Betaine | 90% | 95% | 92% | 95% |
| Phosphate Ester | 75% | 80% | 77% | 84% |
| Quaternary Amine | 88% | 92% | 91% | 92% |
| Polyol | 86% | 89% | 90% | 90% |
| Complex Polyol Ester | 56% | 70% | 64% | 72% |
| Alcohol Alkoxylate | 85% | 88% | 91% | 89% |
| Thiophosphate Ester | 87% | 98% | 91% | 94% |

Betaine, phosphate ester, quaternary amine, polyol, complex polyol ester, alcohol alkoxylate, and thiophosphate ester in column A represents 5 mol. % of the surfactant booster for 95 mol. % of citric acid in column B, 95 mol. % of glycolic acid in column C, 95 mol. % of acetic acid in column D, and 95 mol. % of formic acid in column E. The mol. % is respect to a total additive of the organic acid and organic acid surfactant booster. Therefore, the addition of 5 mol. % betaine improves the removal of amine by 8 to 11%. The addition of thiophosphate ester improves the removal of amine by 5% to 14%.

Figure 5:
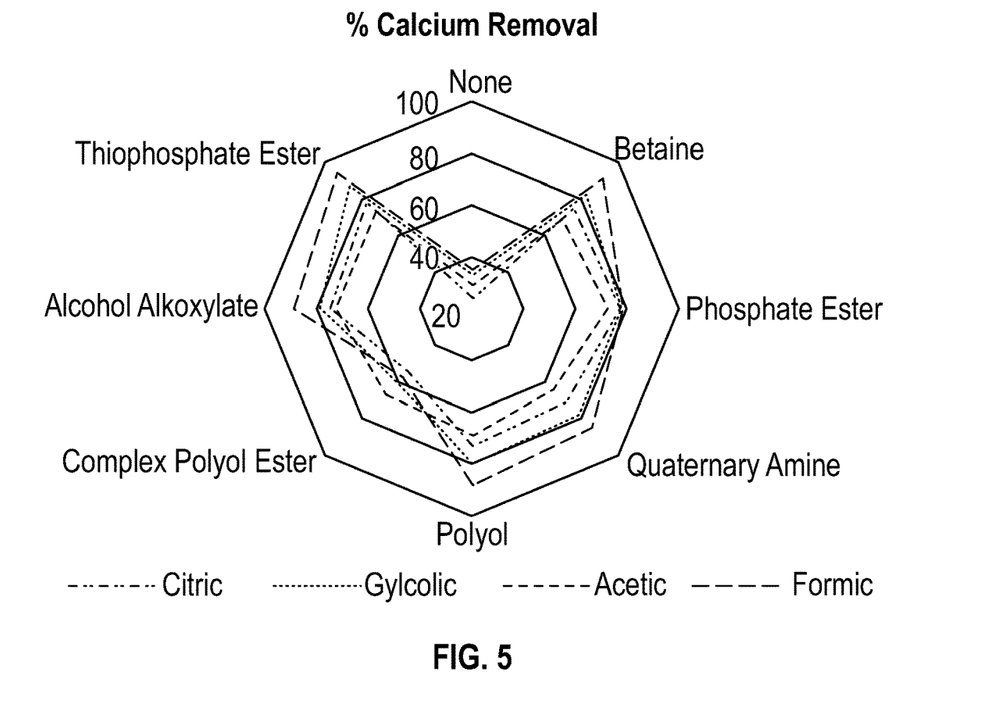
FIG. 5 is another graph illustrating the contaminant removal effectiveness for various additives in accordance with some embodiments of the present disclosure.

The percentage of calcium removed from the solution was also recorded as a function betaine, phosphate ester, quaternary amine, polyol, complex polyol ester, alcohol alkoxylate, and thiophosphate ester in combination with citric acid, glycolic acid, acetic acid, and formic acid, respectively. The results are provided in FIG. 5 and summarized in Table 2 below:

TABLE 2

| Column A | B Citric | C Glycolic | D Acetic | E Formic |
|---|---|---|---|---|
| None | 24% | 33% | 29% | 35% |
| Betaine | 75% | 82% | 69% | 91% |
| Phosphate Ester | 77% | 78% | 72% | 78% |
| Quaternary Amine | 71% | 78% | 64% | 85% |
| Polyol | 73% | 80% | 69% | 88% |
| Complex Polyol Ester | 55% | 61% | 67% | 58% |
| Alcohol Alkoxylate | 75% | 79% | 73% | 89% |
| Thiophosphate Ester | 78% | 87% | 73% | 94% |

Betaine, phosphate ester, quaternary amine, polyol, complex polyol ester, alcohol alkoxylate, and thiophosphate ester in column A represents 5 mol. % of the surfactant booster for 95 mol. % of citric acid in column B, 95 mol. % of glycolic acid in column C, 95 mol. % of acetic acid in column D, and 95 mol. % of formic acid in column E. The mol. % is calculated based upon the total amount of additive of the organic acid and organic acid surfactant booster. Therefore, the addition of 5 mol. % betaine improves the removal of calcium by 40% to 56%. The addition of thiophosphate ester improves the removal of calcium by 44% to 59%.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method of contaminant removal, wherein contaminant comprises amines and metals, comprising:
   introducing one or more organic acids and one or more organic acid surfactant boosters into a hydrocarbon-containing stream, wherein the one or more organic acids and the one or more organic acids surfactant boosters are introduced into the hydrocarbon-containing stream at about a 0.01 to about 5% mol ratio surfactant to organic acid;
   recovering the hydrocarbon-containing stream from a subterranean formation; and
   separating at least a portion of contaminants from the hydrocarbon-containing stream, wherein at least the one or more organic acids and/or the one or more organic acid surfactant boosters interact with the contaminants in the hydrocarbon-containing stream to promote greater solubility of cationic contaminants in water and anionic contaminants in oil.

2. The method of claim 1, wherein the one or more organic acids comprises at least one organic acid selected from the group consisting of acetic acid, citric acid, formic acid, maleic acid, glycolic acid, oxalic acid, lactic acid, uric acid, malic acid, and tartaric acid, and any combination thereof.

3. The method of claim 1, wherein the one or more organic acid surfactant boosters comprise at least one surfactant selected from the group consisting of a betaine, phosphate ester, a quaternary amine, a polyol, a complex polyol ester, sulfonate, a sulfosuccinate, a thiophosphate ester, an alcohol alkoxylate, a sorbitan monooleate, and any combination thereof.

4. The method of claim 1, wherein the one or more organic acid surfactant boosters comprise a betaine.

5. The method of claim 1, wherein the one or more organic acid surfactant boosters comprise a thiophosphate ester.

6. The method of claim 1, wherein the one or more organic acids and one or more organic acid surfactant boosters are injected in an injector well.

7. The method of claim 1, wherein the one or more organic acids and the one or more organic acids surfactant boosters are separately added to the hydrocarbon-containing stream.

8. The method of claim 1, wherein the introducing the one or more organic acids and one or more organic acid surfactant boosters into the hydrocarbon-containing stream comprises introducing the one or more organic acids and the one or more organic acid surfactant boosters into a wellbore to contact the hydrocarbon-containing stream in the wellbore.

9. The method of claim 8, wherein the separating is performed in the wellbore.

10. The method of claim 1, wherein the separating is performed subsea.

11. The method of claim 1, wherein the introducing one or more organic acids and one or more organic acid surfactant boosters into the hydrocarbon-containing stream comprises flowing the one or more organic acids and one or more organic acid surfactant boosters through and umbilical to a subsea wellhead.

12. The method of claim 1, wherein one or more organic acids and one or more organic acid surfactant boosters are added to a treatment fluid that is pumped into a well bore.

13. The method of claim 1, wherein the separating further comprises removing salt from the hydrocarbon-containing stream.

14. The method of claim 1, wherein the separating removes amines from the hydrocarbon-containing stream in an amount of about 50% or more by weight of the hydrocarbon-containing stream and further removes calcium from the hydrocarbon-containing stream in an amount of about 30% or more by weight of the hydrocarbon-containing stream.

15. The method of claim 1, wherein the separating removes the amines from the hydrocarbon-containing stream in an amount of about 80% or more by weight of the hydrocarbon-containing stream and further calcium from the hydrocarbon-containing stream in an amount of about 70% or more by weight of the hydrocarbon liquid.

16. A method of contaminant removal, wherein contaminant comprises amines and metals, comprising:
  introducing one or more organic acids and one or more betaines into a wellbore to contact a hydrocarbon-containing stream, wherein the one or more organic acids and the one or more betaines are introduced into the treatment fluid at an organic acid to organic acid surfactant booster mole ratio of about 0.01:0.5 thereby promoting greater solubility of cationic contaminants in water and anionic contaminants in oil; and
  separating salt from the hydrocarbon-containing stream, wherein the separating salt further removes at least amines and calcium from the hydrocarbon-containing stream.

17. The method of claim 16, wherein the one or more organic acids and one or more betaines are introduced into the wellbore through coiled tubing.

18. The method of claim 16, wherein the one or more betaines comprise a cocamidopropyl betaine.

* * * * *